(12) United States Patent
Ganesh et al.

(10) Patent No.: US 9,613,144 B2
(45) Date of Patent: Apr. 4, 2017

(54) SEARCH RESULTS ENHANCEMENT SYSTEMS AND RELATED METHODS

(71) Applicant: United Parcel Service of America, Inc., Atlanta, GA (US)

(72) Inventors: Bala Ganesh, Alpharetta, GA (US); Scott Castaldo, Woodstock, GA (US); Amber Sappington, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 205 days.

(21) Appl. No.: 14/210,736

(22) Filed: Mar. 14, 2014

(65) Prior Publication Data

US 2014/0280002 A1    Sep. 18, 2014

Related U.S. Application Data

(60) Provisional application No. 61/785,949, filed on Mar. 14, 2013.

(51) Int. Cl.
*G06F 17/00* (2006.01)
*G06F 17/30* (2006.01)

(52) U.S. Cl.
CPC .. *G06F 17/30864* (2013.01); *G06F 17/30867* (2013.01); *G06F 17/30967* (2013.01)

(58) Field of Classification Search
CPC ......... G06F 17/30424; G06F 17/30867; G06F 17/3053; G06F 17/30554; G06F 17/30563
See application file for complete search history.

(56) References Cited

U.S. PATENT DOCUMENTS

| 6,360,215 B1* | 3/2002 | Judd ................ G06F 17/30864 |
| 2009/0192985 A1* | 7/2009 | Bolls ................ G06F 17/30648 |
| 2013/0018723 A1* | 1/2013 | Khanna ............. G06Q 30/0241 |
| | | 705/14.49 |

* cited by examiner

*Primary Examiner* — Truong Vo
(74) *Attorney, Agent, or Firm* — Shook, Hardy & Bacon L.L.P.

(57) ABSTRACT

A system and method for enhancing search results is described. The system receives information and data about retailers and social network data about a user. The system then detects search terms input by the user into a search field (e.g., on a search webpage) and modifies the search terms at least partially based on the information associated with the various retailers and the social network data. The system (or the user) then submits the modified search terms to a search engine and receives search results based on the modified search terms.

28 Claims, 4 Drawing Sheets

SEARCH RESULTS ENHANCEMENT SYSTEMS AND RELATED METHODS

CLAIM OF PRIORITY

This application claims the benefit of priority under 35 U.S.C. §119(e) to the filing date of U.S. Provisional Patent Application No. 61/785,949, filed Mar. 14, 2013, entitled, "Search Results Enhancement Systems and Related Methods," which is incorporated herein by reference in its entirety.

BACKGROUND

A simple Internet search can produce thousands of results. An individual may find combing through this large number of search results to find a product or service frustrating. At the same time, retailers may be frustrated if their company, products, and/or services do not appear when relevant terms are searched.

Various embodiments of present systems and methods recognize and address the foregoing considerations.

SUMMARY

According to various embodiments a computer system is configured for: 1) receiving entity data including information associated with an online retailer; 2) receiving social network data including data associated with a user; 3) receiving a set of search terms associated with the user for use in an Internet search, wherein the set of search terms include one or more search terms input by the user; 4) creating a revised set of search terms based at least in part on the social network data and/or the entity data; and 5) initiating an Internet search based, at least in part, on the revised set of search terms.

In various embodiments, a computer system is configured for: 1) receiving entity data including information associated with a one or more online retailers; 2) receiving social network data associated with a user; 3) receiving one or more search terms associated with the user, wherein the one or more search terms are associated with a search field associated with a search engine; 4) modifying the one or more search terms based at least in part on the received social network data; 5) sending to a remote computer associated with the search engine the modified one or more search terms; 6) receiving one or more search results associated with the Internet search; and 7) sending the one or more search results to a client device associated with the user.

According to particular embodiments, a non-transitory computer readable medium stores computer executable instructions for: 1) collecting one or more search terms entered by a user into a field associated with a search engine; 2) sending the one or more search terms to a remote computing system, wherein the one or more search terms are modified by the remote computing system at least partially based on social network data associated with the user; 3) receiving the modified one or more search terms from the remote computing system; 4) submitting the modified one or more search terms to the search engine; 5) at least partially in response to submitting the modified one or more search terms, receiving one or more search results from the search engine; and 6) displaying the one or more search results to the user.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS

Various embodiments will be described more fully hereinafter with reference to the accompanying drawings. It should be understood that the invention may be embodied in many different forms and should not be construed as limited to the embodiments set forth herein. Like numbers refer to like elements throughout.

System Overview

Computer systems, according to various embodiments, may be adapted to enhance a computerized search, such as an Internet search conducted by a search engine. The system may modify the search, for example, by modifying one or more keywords used in conducting the search (which may be a keyword search) and then displaying the results of the modified search to a user. A user may, for example, perform a search containing a particular search query (e.g., using any suitable search engine). The system, in particular embodiments, then modifies the search query, for example, based at least in part on information associated with the user, information associated with one or more social network accounts associated with the user, and/or information and/or offers associated with an online retailer. For example, for a user whose user profile on a particular social network indicates that they male and have a high income, the system may modify a search by the user for 'grey sweaters' to 'men's cashmere grey sweaters.' By modifying search queries (and therefore the results of the corresponding searches), the system may provide users with search results that are more relevant to them.

To provide these enhanced results, the system, in various embodiments, utilizes information associated with the user and/or with various online retailers. In particular embodiments, the system is configured to receive information associated with the user (e.g., social networking information, purchase history information, personal information, etc.). In particular embodiments, this information may include, for example, personal information such as the user's age, gender, profession, friends, hobbies, interests, income level, spending habits, etc.

In some embodiments, the system may also be configured to collect and/or receive information associated with an online retailer (e.g., entity data). The information associated with the online retailer may include, for example, the retailer's products, target demographics, and competitors. The retailer information may also include current discount offers on the one or more retailer's products. The system, in various embodiments, is configured to use the user information, the information associated with the online retailer, and/or any other suitable information to modify the search query.

The system may be implemented in various ways by any of a number of entities. In various embodiments, the system is provided by a logistics company or any other suitable company that can access consumer data. Moreover, the system may be implemented using a user's computing device (laptop computer, desktop computer, mobile device, etc.), on a company's servers, a social network server, a third party server (e.g., a retailer's server), or any combination of user's devices and servers.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized, including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

Figure 1:
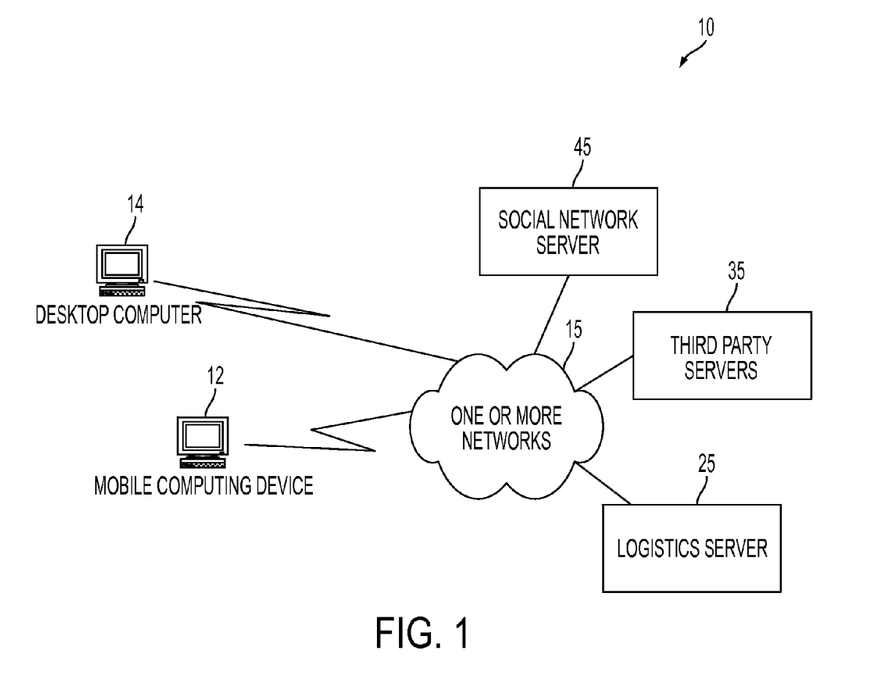
FIG. 1 is a block diagram of a Search Modification System according to one embodiment.

FIG. 1 shows a block diagram of a Search Modification System 10 according to a particular embodiment of the present invention. As may be understood from this figure, the Search Modification System 10 may include one or more Networks 15, a Logistics Server 25, one or more Third Party Servers 35 (e.g., a web hosting server, retailer's server, any other server that hosts websites), a Social Network Server 45 (e.g., a sever associated with any service that allows users to make connections and/or to publically or privately share data, pictures, videos, or information), and one or more of the following: a Mobile Computing Device 12 (e.g., a handheld computing device, a laptop computer, a smart phone, a tablet computer, or any other mobile computing device) or a Desktop Computer 14.

The one or more Networks 15 facilitate communication between the Mobile Computing Device 12, Desktop Computer 14, Logistics Server 25, Third Party Servers 35, and Social Network Server 45. These one or more Networks 15 may include any of a variety of types of computer networks such as the Internet, a private intranet, a public switch telephone network (PSTN), WAN, LAN, or any other type of suitable network. In certain variations of the embodiment shown in FIG. 1, both the communication link between the Mobile Computing Device 12, Desktop Computer 14, Logistics Server 25, Third Party Servers 35, and Social Network Server 45 are implemented via the Internet using Internet Protocol (IP). The communication link between the Logistics Server 25, Third Party Servers 35, and Social Network Server 45 may be, for example, implemented via a LAN or WAN.

It should be understood that the Servers 25, 35, and 45 do not necessarily need to be deployed over the network. For example, in various embodiments, any or all of Severs 25, 35, and 45 may be deployed locally on the user's computer, tablet, and/or mobile device.

Figure 2:
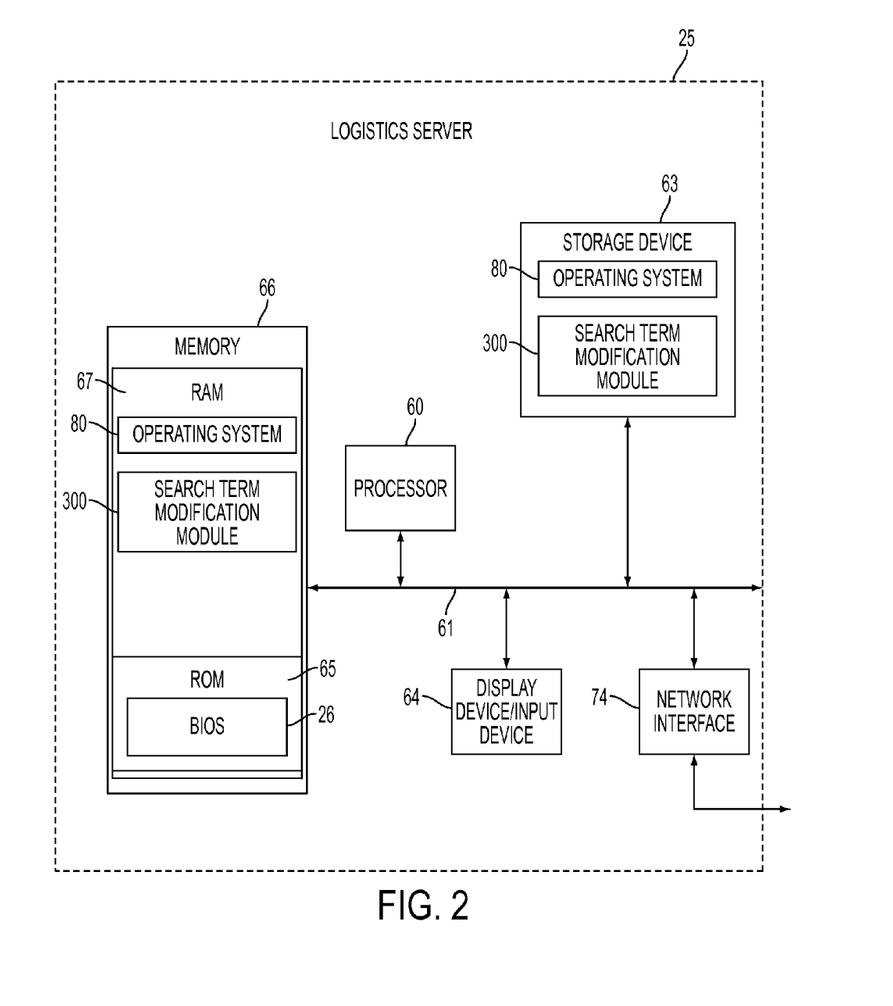
FIG. 2 is a block diagram of an Exemplary Logistics Server of FIG. 1.

FIG. 2 shows a block diagram of an exemplary embodiment of an exemplary Logistics Server 25 that is configured for executing a Search Term Modification Module 300. It should be understood based on this disclosure that any suitable computers (e.g., any of the computing devices shown in FIG. 1) may be used to execute this module and that various steps executed by the module may be executed on different computers.

The Logistics Server 25 may include several basic computer hardware components. As may be understood from FIG. 2, in this embodiment, the Logistics Server 25 includes a Processor 60 that communicates with other elements within the Logistics Server 25 via a System Interface or Bus 61. The Logistics Server 25 also includes a Display Device/Input Device 64 for receiving and displaying data. This Display Device/Input Device 64 may be, for example, a keyboard, voice recognition, or pointing device that is used in combination with a monitor. The Logistics Server 25 further includes a Memory 66, which preferably includes both a Read Only Memory (ROM) 65 and a Random Access Memory (RAM) 67. The server's ROM 65 may be used to store a Basic Input/Output System (BIOS) 26 that contains the basic routines that help to transfer information between elements within the Logistics Server 25.

Also located within the Logistics Server 25 is a Network Interface 74 for interfacing and communicating with other elements of a computer network. It will be appreciated by one of ordinary skill in the art that one or more components of the Logistics Server 25 may be located geographically remote from other components of the Logistics Server 25 and/or that certain components may be omitted from particular embodiments. Furthermore, one or more of the components may be combined, and additional components performing functions described herein may be included in the Logistics Server 25.

The Logistics Server 25 may also include at least one Storage Device 63, such as a hard disk drive, a floppy disk drive, a CD Rom drive, or an optical disk drive, for storing information on various computer-readable media, such as a hard disk, a removable magnetic disk, or a CD-ROM disk. As will be appreciated by one of ordinary skill in the art, each of these Storage Devices 63 may be connected to the Bus 61 by an appropriate interface. The Storage Devices 63 and their associated computer-readable media may provide nonvolatile storage for the Logistics Server 25. It should be noted that the computer-readable media described above could be replaced by any other type of computer-readable media known in the art. Such media includes, for example, magnetic cassettes, flash memory cards, and digital video disks.

A number of program modules may be stored by the various storage devices and/or within the RAM 67. Such program modules include an Operating System 80 and the Search Term Modification Module 300. For simplicity and brevity, these modules are merely exemplary and may represent a number of program modules which control certain aspects of the operation of the Logistics Server 25 with the assistance of the Processor 60 and the Operating System 80. The Search Term Modification Module 300 is described in more detail below.

Search Term Modification Module

Figure 3:
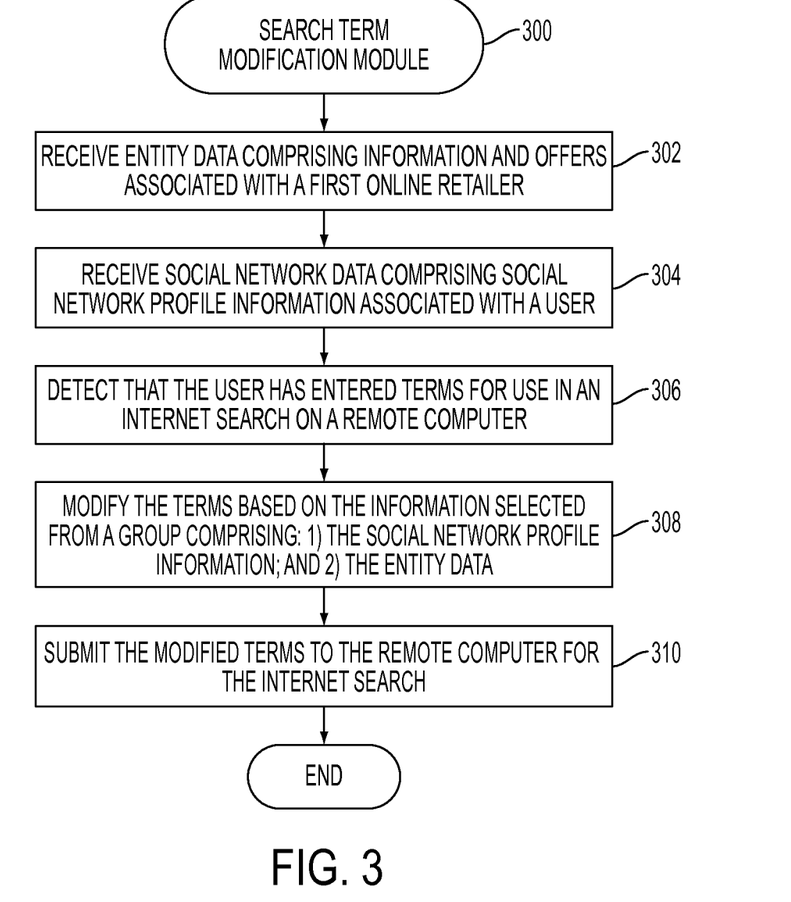
FIG. 3 shows a flow diagram that generally illustrates various steps executed by the exemplary Search Term Modification Module in FIG. 2 in accordance with various embodiments of the system of FIG. 1.
Figure 4:
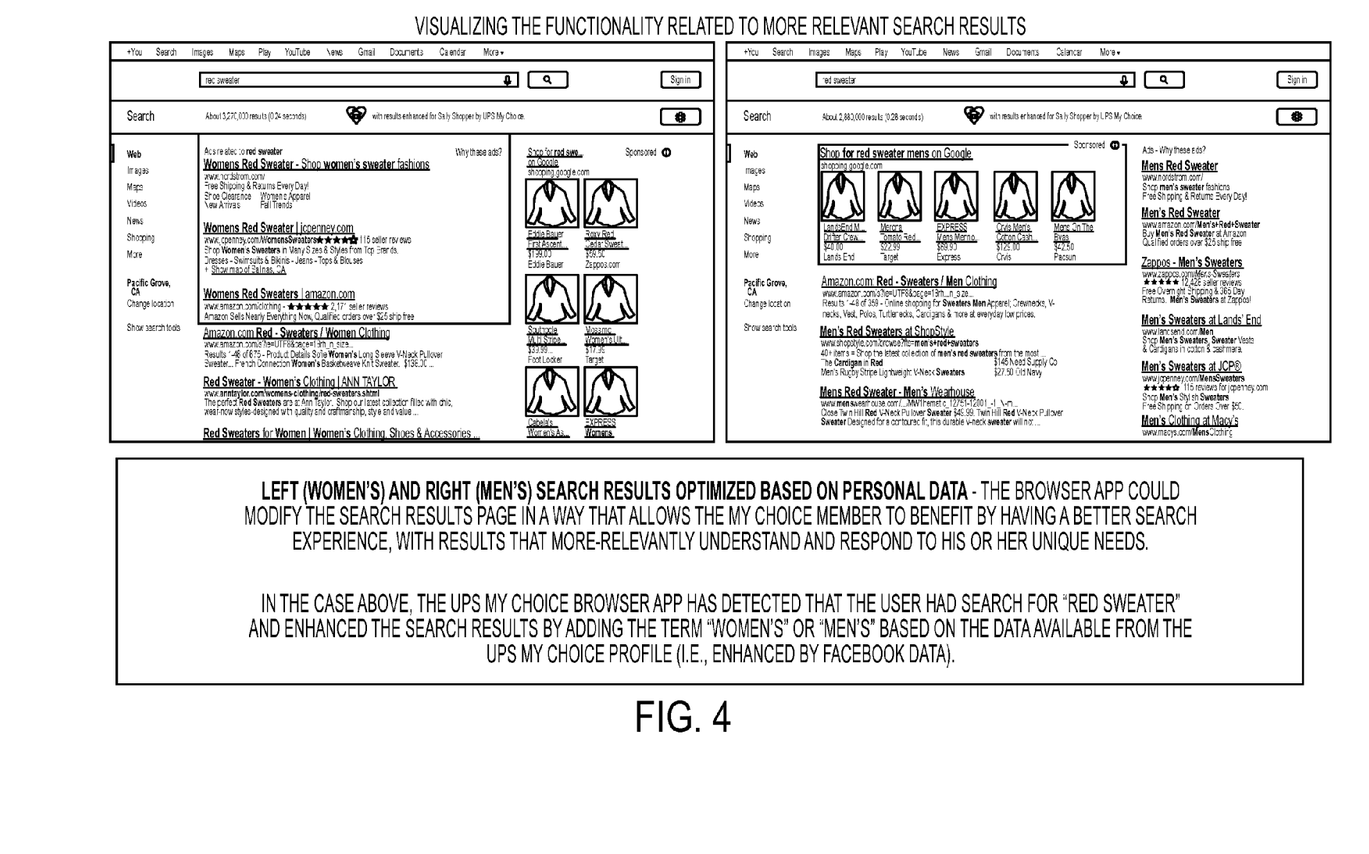
FIG. 4 depicts screenshots and descriptions of various aspects and embodiments of the exemplary Search Term Modification Modules of FIG. 2.

As shown in FIG. 3, certain embodiments of the Search Term Modification Module 300 may be configured to gather and utilize data to modify search terms used within a computer-implemented search, such an Internet Search implemented by a suitable search engine, such as Google®. The Search Term Modification Module 300 may operate alone or in combination with the Operating System 80 to perform the functions shown in FIG. 3. It should be understood by one skilled in the art that certain embodiments of the Search Term Modification Module 300 may perform the functions shown in FIG. 3 in an order other than the order shown in FIG. 3. It should also be understood that various systems, when executing the Search Term Modification Module 300 may omit particular functions or perform additional functions in performing the functions of the Search Term Medication Module 300.

Exemplary Functionality of the Search Results Modification Module: FIG. 3

Receiving Information and Data

Beginning at Step 302, according to various embodiments, the Search Term Modification Module 300 receives entity data including information and offers associated with a first online retailer. The system may be configured to receive the entity data from any suitable source. According to a particular embodiment, the system is configured to receive the entity data from the first online retailer and/or from the first online retailer's servers (e.g., the Third Party Servers 35). In further embodiments the system is configured to receive the entity data from a logistics server (e.g., the Logistics Server 25).

The system may be configured to receive any suitable type of information and/or offers associated with the first online retailer. Such information may include, for example, the first online retailer's name, one or more products that the first online retail is offering for sale, one or more prices for those and other products offered by the retailer, and any other information or offers that may be suitable for use by the system to enhance or otherwise modify search results for a user.

In some embodiments, the system is configured to receive characteristics of customers who typically purchase from the online retailer or similar retailers (e.g., such as an age range, occupation, gender, spending habits, typical rate of purchase for a certain time period, etc.). In other embodiments, the system may be configured to receive other information associated with the entity, such as, for example, one or more locations associated with the entity, one or more categories of products and/or services sold by the entity (e.g., shoes, clothing, and/or airline tickets), one or more price ranges of products typically sold by the entity, current sale prices associated with the entity, and/or one or more specific products and/or services sold by the entity.

In a particular embodiment, the system is configured to receive one or more offers associated with one or more products for a discount on the one or more products. In another embodiment, the system is configured to receive one or more offers associated with one or more accessories associated with one or more products of the first online retailer. In further embodiments, the system is configured to receive one or more offers from an online retailer for one or more products associated with a retailer other than the online retailer, such as, for example, an offer for a product of another online retailer that is a partner of the online retailer.

The first online retailer may be any online retailer. In various embodiments, the online retailer is a retailer that sells one or more various brands, but specializes in a specific type of merchandise (e.g., an online shoe retailer). In other embodiments, the online retailer specializes in one specific brand (e.g., Calvin Klein®). In still other embodiments, the online retailer is a general online retailer (e.g., Amazon®). In other embodiments, the online retailer specializes in services, group discounts, and/or wholesale items.

At Step, 304, the system receives social network data. The social network data may include any suitable data associated with a social network. In various embodiments, the social network data may include data associated with one or more users and the one or more user's associated products, likes, dislikes, and/or habits associated with the social network (e.g., the system may be configured to receive data about a particular subset of user's buying habits as determined by the subset of user's habits on the social network). In a particular embodiment, the social network data includes social network profile data associated with the user.

The social network profile information associated with the user may by any suitable information included in a social network. According to a particular embodiment, the social network profile information is associated with the user through an account with the social network (e.g., that may be associated with the Social Network Server 45). In a particular embodiment, the user logs in to the social network and may update their "profile" with their personal information, which may include, for example, the user's likes (including products and companies that the user likes), the user's dislikes, the user's age, the user's gender, the user's religious beliefs, the user's political orientation, quotations from the user, the user's contact information, the user's relationship status, places the user has lived, where the user currently lives, where the user attended school, the user's profession, where the user has worked, where the user currently works, etc. Continuing with this embodiment, the user may upload, to their profile: photos, status updates, articles, music, and other files or information. Additionally, in various embodiments, the user may connect with other users of the social network (e.g., by becoming "Friends®" on Facebook®).

The social network data may include any additional suitable information (or information other than the social network profile information associated with the user). In other embodiments, the social network data includes the types of advertisements the user has accessed (e.g., clicked) from one or more social networks. In further embodiments, the social network data includes information associated with one or more applications the user has used that are associated with the social network (e.g., the user has used several applications that function and/or plug-in to the social network). In still further embodiments, the social network data includes purchasing characteristics of the user associated with purchases the user has made via the social network (e.g., information associated with one or more items purchased through the social network, such as, through a shopping plug-in).

The purchasing characteristics of the user may include any appropriate characteristics associated with the user. In various embodiments, the purchasing characteristics include buying habits of the user as tracked by the social network (e.g., buying habits based on purchases the user has shared on the social network, purchases the user has made while logged into the social network, etc.). In some embodiments, the purchasing characteristics include data collected by the social network about the user's buying habits and/or predicted buying habits. In a particular example, the social network may have mined particular data about the user from the user's activities on the social network and determined certain predicted/predictable buying habits of the user.

At Step 306, the system detects that the user has entered terms for use in an Internet search.

The search terms may include any one or more suitable types of search parameter. In various embodiments, the terms may be text entered by the user (e.g., "red sweater"). In further embodiments, the terms may be a picture (e.g., in a image search). In still further embodiments, the terms may be a sound clip or any other digital searchable term.

The system may be configured to detect that the user has entered search terms in any of a variety of suitable ways. In various embodiments, the system is configured to examine all of the text a user enters into an appropriate field on the Internet to detect if typical search terms have been entered. In other embodiments, the system is configured to substantially automatically (e.g., automatically) detect that the user has entered one or more search terms into a search engine webpage. In further embodiments, the system is configured to detect that the user has entered one or more search terms into a search bar associated with a web browser (e.g., a search bar included with the web browser and/or a browser add-on that includes a search bar such as the Yahoo® Toolbar).

In some embodiments, the system is configured to detect that the user has entered one or more search terms for a search into a field associated with a search engine and has submitted the one or more search terms to the search engine (e.g., by typing search terms into a search field on a search engine webpage and pressing "enter" on a keyboard). According to one such embodiment, the system is configured to receive the search terms before the search is performed by the search engine (e.g., the system is configured to "intercept" the search term submission before a search is actually performed by the search engine). The system may receive the one or more search terms by any suitable mechanism, including, but not limited to a browser add-on and/or an API.

According to various embodiments, the system detects that search results have been sent to the user in response to the user submitting search terms (e.g., after the user submits the one or more search terms but before the user receives the results). In this particular embodiment, the system may be configured to prevent the results from being displayed to the user and, after modifying the one or more search terms, resubmits the modified one or more search terms as discussed below.

Modifying Search Terms

Continuing at Step 308, the system modifies the one or more search terms based at least in part on received information (e.g., as described above). The received information may be any received information, such as the user's social network profile information and/or the entity data. In a particular embodiment, the system is configured to modify the search terms based on the social network data, including the social network profile information associated with the user as described above (e.g., the system modifies the one or more search terms based on the gender of the user as indicated via the social network profile information). In various embodiments the system is configured to modify the search terms based on the entity data (e.g., to add entity data to more prominently display particular search terms associated with particular entities).

The system is configured to modify the search terms in any suitable way. According to one embodiment, the system is configured to add text to the search terms (e.g., by adding "men's" to "red sweater" so that the search terms are "men's red sweater"). In other embodiments, the system is configured to add text to the search terms to effectively exclude, from the search (e.g., using Boolean search functionality), certain dislikes of the user as indicated in the user's social network profile information. In further embodiments, the system is configured to add or subtract search terms to look for special offers based on the entity or social network profile information. In still further embodiments, the system is configured to add or subtract other search perimeters such as location (e.g., geo-positioning data), images (e.g., in an image search), etc. In this way, in particular embodiments, modification of the search terms by the system may provide the user with search results that are of increased relevance to the user.

At Step 310, the system submits the modified search terms for the Internet search (e.g., by providing the modified search terms to any suitable search engine, including, in various embodiments, a different search engine than that associated with the search field). The system may be configured to submit the modified one or more search terms to any suitable mechanism that can perform an Internet search. In various embodiments, the system submits the modified terms directly to a remote computer (e.g., the one or more Third Party Servers 35). In further embodiments, the system submits the modified search terms to a logistics server (e.g., the Logistics Server 25), which then submits the modified terms to the remote computer (e.g., one or more remote computers).

In particular embodiments, the system is further configured to display, or otherwise convey, the resultant search results from the modified search terms to the user. The system may be configured to display the search results to the user in any appropriate way. In some embodiments, the system is configured to display the search results to the user in a web browser and/or web browser add-on (including on a mobile device). In various embodiments, the system is configured to display the results to the user via an email, a SMS message, and/or social network message.

In a particular embodiment, the system is configured to display the one or more preferences of the user with the modified search results on the search results webpage. In further embodiments, the system is configured to display the one or more preferences of the user in a browser window separate from the search results webpage. In still further embodiments, the system is configured to display the one or more preferences of the user in a pop-up style window and/or any other suitable way Exemplary Search Term Modification Functionality FIG. 5 depicts an exemplary user example of the present systems and methods. The following example is provided to further enhance understanding of the present systems and methods. It should be understood that the present systems and methods may be embodied in many different forms and the following example should not be construed as limited to the embodiment set forth herein. Rather, this embodiment is provided so that this disclosure will be thorough and complete, and will fully convey the scope of the present system and method to those skilled in the art.

FIG. 5 depicts a search results webpage 500 as seen on the browser of a client device. The search results webpage 500 includes, in this example, a search term field 502 (e.g. for a user to input one or more search terms to submit to a search engine for an Internet search), a "search" button 504 (e.g., a user-selectable indicium to submit the one or more search terms input by the user into the search term field to one or more associated search engines), a status indicator 506 (e.g., information to notify to the user if the search results displayed are enhanced by the system), shopping results associated with the search engine 508 associated with the search terms entered by the user and modified by the system, search results 510 associated with the modified search results, and advertisements associated with the modified search results 512. In this exemplary embodiment, the user has installed a web browser plug-in (not shown) and is logged into an account associated with the system through the web browser plug-in. In various embodiments, the web browser plug-in is configured to collect search terms entered into the search term field 502 and transmit the search terms to a remote computing system (e.g., the remote computing system receives the one or more search terms entered by the user) before the search terms are submitted to one or more associated search engines.

In this example, the user has input the search terms "red sweater" into the search field 502. The user then submits the search terms by, for example, selecting the user-selectable indicium 504, pressing "enter" or "return" on a user-input device, and/or via an instant or predictive search (e.g., wherein the search terms are submitted as the terms are entered, as in a system utilizing a predictive search-type system).

Once the user submits the search terms, the web browser add-on transmits the one or more search terms (e.g., "red sweater") to an associated remote computing system. The remote computing system accesses user data associated with an account associated with the user. In this particular instance, the user data includes social network data that indicates that the user is a male. In this example, the remote computing system then adds the additional search term "mens" to the received search terms, "red sweater." The resulting enhanced search terms are "mens red sweater." The remote computing system is then configured, in this example, to submit the enhanced search terms to the one or more search engines associated with the search field 502.

The one or more search engines associated with the search field 502 may return numerous types of results associated with the one or more enhanced search terms. In this particular example, the one or more search engines return: 1) shopping results associated with the one or more search engines; 2) one or more search results associated with the one or more enhanced search terms 510; 3) and advertisements associated with the one or more enhanced search terms 512. Additionally, as shown in FIG. 5, the status indicator 506 indicates that the search terms entered by the user have been enhanced.

Alternate Embodiments

Alternative embodiments of the system may include features that are, in some respects, similar to the various components described above. Selected distinguishing features of these alternative embodiments are discussed below.

The System May Modify the Search Terms at Least Partially Based on User Preferences In various embodiments, the system may be configured to modify the search terms of an Internet search by the user (e.g., at Step 308) at least partially based on one or more preferences of the user (e.g., the user can set the preferences and/or the system collects the preferences from previous data, such as previously clicked on search results). The one or more preferences of the user may be any suitable preferences including, but not limited to: 1) product and/or service types (e.g., running shoes); 2) certain brands (e.g., the user prefers Nike® shoes); 3) specific attributes of products and/or services (e.g., the user prefers only black shoes, the user prefers only shoes with laces, the user prefers online shoe sellers, the user wears a certain size shoe, etc.) and/or 4) any combination of one or more preferences of the user (e.g., the user prefers black Nike® running shoes).

Continuing with this example, the system may be configured to receive the one or more preferences of the user in one or more suitable ways. In a particular embodiment, the system is configured to enable the user to indicate the one or more preferences (e.g., the user indicates they prefer Nike® shoes). In another embodiment, the system is configured to receive the one or more preferences of the user via social network data, as received, for example, in Step 304 above (e.g., the user has indicated on a social network that they are male, so the system receives the social network data indicating the user is male and modifies the search term from "shoes" to "men's shoes").

The System May Enable the User to Modify the User Preferences

According to particular embodiments, the system is configured to enable the user to modify the one or more preferences of the user in any suitable way and by any suitable mechanism. In various embodiments, the system enables the user to modify the one or more preferences of the user on the search results webpage (e.g., when the search results are displayed to the user). In other embodiments, the system is configured to enable the user to modify the one or more preferences of the user on a social network, on a logistics provider's website, through a web browser add-on, etc.

The System May Modify Search Terms during a Predictive Search

In various embodiments, the system may be configured to modify the search results of a predictive search (e.g., a search is conducted by one or more search engines on search terms entered by the user into a search field as the user enters them and/or a search is conducted on search terms as the user enters them as well as terms predicted by the one or more search engines). In a particular embodiment, the system is configured to detect the user is entering search terms into an appropriate search field and submits the appropriate modifier so the predictive search is changed by the modifier. As a particular example, the user enters the search term "red" into a search field. In this example, the system is configured to detect this entry (e.g., of "red") and predicts, based on appropriate data (such as social network, entity, and/or search-associated collected data), that the user is searching for clothing. The system then, continuing with this example, adds "mens" to the search term as the modifier. In this way, the predictive search displays results associated with "mens red," instead of just "red." In this example, if the user additionally types "sweater" into the search field, the completed search terms may be "mens red sweater."

CONCLUSION

Many modifications and other embodiments of the present systems and methods will come to mind to one skilled in the art having the benefit of the teachings presented in the foregoing descriptions and associated drawings. Therefore, it is to be understood that the present systems and methods are not to be limited to the specific embodiments disclosed and that modifications and other embodiments are intended to be included within the scope of the appended claims. Although specific terms are employed herein, they are used in a generic and descriptive sense only and not for the purposes of limitation.

We claim:
1. A computer system comprising:
at least one processor, said computer system configured for:
(A) receiving entity data comprising information associated with an online retailer and including one or more of: a name associated with the online retailer, a location associated with the online retailer; one or more products offered for sale by the online retailer; one or more prices associated with the one or more products; characteristics of customers who typically purchase from the online retailer; characteristics of customers who typically purchase from competitors of the online retailer; one or more categories of products and/or services sold by the online retailer; and one or more price ranges of products typically sold by the online retailer;
(B) receiving social network data comprising data associated with a user;
(C) receiving a set of search terms associated with the user for use in an Internet search, wherein the set of search terms comprise one or more search terms input by the user;
(D) intercepting the set of search terms prior to performance of the Internet search;
(E) creating a revised set of search terms from the intercepted set of search terms based at least in part on data selected from a group consisting of:
the social network data; and
the entity data; and
(F) initiating an Internet search based, at least in part, on the revised set of search terms.

2. The computer system of claim 1, wherein the social network data comprises gender information associated with the user.
3. The computer system of claim 2, wherein:
(A) the revised set of search terms comprises one or more search terms, wherein the one or more search terms are gender-neutral; and
(B) creating the revised set of search terms comprises modifying the one or more search terms to include the gender information associated with the user.
4. The computer system of claim 1, wherein the computer system is further configured for:
(A) receiving one or more search results associated with the Internet search; and
(B) transmitting said results to a client device associated with the user.
5. The computer system of claim 1, wherein:
(A) the Internet search returns one or more search results; and
(B) the one or more search results are received by a client device associated with the user.
6. The computer system of claim 5, wherein creating the revised set of search terms comprises creating the revised set of search terms based at least in part on the social network data, wherein the social network data comprises one or more characteristics of the user.
7. The computer system of claim 6, wherein the one or more characteristics of the user are based at least in part on a profile associated with the user on the social network.
8. The computer system of claim 5, wherein creating the revised set of search terms further comprises creating the revised set of search based at least in part on the entity data.
9. The computer system of claim 8, wherein:
(A) creating the revised set of search terms further comprises comparing the one or more characteristics of the user and the entity data;
(B) determining whether the one or more characteristics of the user match at least a portion of the entity data; and
(C) if the one or more characteristics of the user match at least a portion of the entity data, creating the revised set of search terms at least partially based on the matched portion of the entity data.
10. A computer system comprising:
at least one processor, said computer system configured for:
(A) receiving entity data comprising information associated with a one or more online retailers;
(B) receiving social network data associated with a user;
(C) providing an Internet search intercepting application to the user for installation on a client device associated with the user.
(D) receiving, via the client device, one or more search terms associated with the user, wherein the one or more search terms are associated with a search field associated with a search engine;
(E) at least partially in response to receiving the one or more search. terms, activating the Internet search intercepting application to intercept the set of search terms prior to performance of the Internet search:,
(F) modifying the one or more search terms based at least in part on the received social network data;
(G) sending to a remote computer associated with the search engine the modified one or more search terms;
(H) receiving one or more search results associated with the Internet search; and (I) sending the one or more search results to the client device associated with the user.

11. The computer system of claim 10, wherein:
(A) the social network data comprises one or more characteristics of the user; and
(B) modifying the one or more search terms based at least in part on the received social network data comprises modifying the one or more search terms at least partially based on the one or more characteristics of the user.

12. The computer system of claim 11, wherein the computer system is further configured for enabling the user to adjust the one or more characteristics of the user.

13. The computer system of claim 12, wherein the one or more characteristics of the user comprises characteristics selected from the group consisting of:
(A) the gender of the user;
(B) one or more products indicated by the user;
(C) one or more companies indicated by the user;
(D) the occupation of the user.

14. The computer system of claim 13, wherein modifying the one or more search terms based at least in part on the received social network data comprises substantially adding at least one of the one or more characteristics of the user to the one or more search terms.

15. The computer system of claim 14, wherein the computer system is further configured for:
(A) receiving one or more search results associated with the Internet search; and
(B) transmitting the one or more search results to a client device associated with the user.

16. The computer system of claim 15, wherein modifying the one or more search terms based at least in part on the gender of the user comprises adding the gender of the user as a search term to the one or more search terms.

17. The computer system of claim 13, wherein:
(A) the one or more characteristics of the user comprises the gender of the user; and
(B) modifying the one or more search terms based at least in part on the received social network data comprises modifying the one or more search terms based at least in part on the gender of the user.

18. A non-transitory computer readable medium storing computer executable instructions for:
(A) collecting one or more search terms entered by a user into a field associated with a search engine;
(B) intercepting the one or more search terms prior to performance of the Internet search;
(C) sending the intercepted one or more search terms to a remote computing system, wherein the intercepted one or more search terms are modified by the remote computing system at least partially based on social network data associated with the user;
(D) receiving the modified one or more search terms from the remote computing system;
(E) submitting the modified one or more search terms to the search engine;
(F) at least partially in response to submitting the modified one or more search terms, receiving one or more search results from the search engine; and
(G) displaying the one or more search results to the user.

19. The non-transitory computer readable medium of claim 18, wherein collecting one or more search terms entered by the user comprises receiving the one or more search terms entered by the user at least partially in response to the user submitting the one or more search terms.

20. The non-transitory computer readable medium of claim 19, wherein the intercepted one or more search terms are modified by the remote computing system by adding one or more new search terms to the intercepted, one or more search terms at least partially based on the social network data associated with the user.

21. The non-transitory computer readable medium of claim 20, wherein the social network data associated with the user comprises at least one characteristic associated with the user, wherein the at least one characteristic associated with the user is one or more characteristics selected from the group consisting of:
(A) the gender of the user;
(B) one or more products indicated by the user;
(C) one or more companies indicated by the user; and
(D) the occupation of the user.

22. The non-transitory computer readable medium of claim 21, wherein:
(A) the remote computing system is associated with a logistics company; and
(B) the social network data associated with the user is associated with an account associated with the user.

23. The non-transitory computer readable medium of claim 19, wherein intercepting the one or more search terms prior to performance of the Internet search comprises preventing the performance of the Internet search using the one or more search terms.

24. A non-transitory computer readable medium storing computer executable instructions for:
(A) collecting one or more search terms entered by a user into a search field;
(B) intercepting the one or more search terms prior to performance of an Internet search;
(C) sending the intercepted one or more search terms to a remote computing system, wherein:
(i) the intercepted one or more search terms are modified by the remote computing system at least partially based on social network data associated with the user; and
(ii) the remote computing system is configured to submit the modified one or more search terms to a search engine;
(D) receiving one or more search results based on the modified one or more search terms from the search engine; and
(E) displaying the one or more search results to the user.

25. The non-transitory computer readable medium of claim 24, wherein:
(A) the remote computing system is associated with a logistics company; and
(B) the social network data associated with the user is associated with an account associated with the user.

26. The non-transitory computer readable medium of claim 25, wherein:
(A) the social network data associated with the user comprises one or more characteristics associated with the user; and
(B) the remote computer system is further configured for enabling the user to adjust said one or more characteristics.

27. The non-transitory computer readable medium of claim 24, wherein the remote computing system is configured to submit the modified one or more search terms to the search engine, wherein the search engine is a search engine other than the search engine associated with the search field.

28. The non-transitory computer-readable medium of claim 24, wherein:

the non-transitory computer-readable medium further stores computer-executable instructions for providing an Internet search intercepting application to the user for installation on a client device associated with the user;

collecting the one or more search terms comprises collecting the one or more search terms entered by the user in a web browser comprising the search field;

the Internet search intercepting application comprises an add-on to the web browser;

intercepting the one or more search terms prior to performance of the Internet search comprises using the add-on to the web browser to intercept the one or more search terms; and the non-transitory computer-readable medium further stores computer-executable instructions for preventing results of an Internet search for the one or more search terms entered by the user from being displayed to the user.

* * * * *

UNITED STATES PATENT AND TRADEMARK OFFICE
CERTIFICATE OF CORRECTION

PATENT NO. : 9,613,144 B2
APPLICATION NO. : 14/210736
DATED : April 4, 2017
INVENTOR(S) : Bala Ganesh et al.

It is certified that error appears in the above-identified patent and that said Letters Patent is hereby corrected as shown below:

In the Claims

Column 12, Line 59: Please remove "search." and replace with --search--.
Column 12, Line 61: Please remove ":," and insert --;--.

Signed and Sealed this
Thirtieth Day of May, 2017

Michelle K. Lee
*Director of the United States Patent and Trademark Office*